(12) United States Patent
Gundy et al.

(10) Patent No.: US 8,775,753 B2
(45) Date of Patent: Jul. 8, 2014

(54) SYNCHRONIZATION OF LOGICAL COPY RELATIONSHIPS

(75) Inventors: Lisa J. Gundy, Tucson, AZ (US); Alfred E. Sanchez, Tucson, AZ (US); David M. Shackelford, Tucson, AZ (US); Warren K. Stanley, Loveland, CO (US)

(73) Assignee: International Business Machines Corporation, Armonk, NY (US)

( * ) Notice: Subject to any disclaimer, the term of this patent is extended or adjusted under 35 U.S.C. 154(b) by 741 days.

(21) Appl. No.: 12/984,489

(22) Filed: Jan. 4, 2011

(65) Prior Publication Data

US 2012/0173830 A1 Jul. 5, 2012

(51) Int. Cl.
*G06F 13/00* (2006.01)
(52) U.S. Cl.
USPC ........... 711/162; 711/156; 714/6.3; 714/6.31; 707/664
(58) Field of Classification Search
CPC ............ G06F 11/2069; G06F 11/2082; G06F 11/1451; G06F 3/065
USPC ............ 714/6.3, 6.31; 711/162, 156; 707/664
See application file for complete search history.

(56) References Cited

U.S. PATENT DOCUMENTS

| 7,278,049 | B2 | 10/2007 | Bartfai et al. | |
|---|---|---|---|---|
| 7,610,318 | B2 | 10/2009 | Bartfai et al. | |
| 2005/0071372 | A1* | 3/2005 | Bartfai et al. | 707/104.1 |
| 2010/0036896 | A1* | 2/2010 | Nakagawa et al. | 707/204 |
| 2010/0131728 | A1* | 5/2010 | Miyamae et al. | 711/162 |
| 2010/0268903 | A1* | 10/2010 | Kihara et al. | 711/163 |
| 2010/0332772 | A1* | 12/2010 | Takeuchi et al. | 711/154 |
| 2012/0089795 | A1* | 4/2012 | Benhase et al. | 711/162 |

* cited by examiner

*Primary Examiner* — Hong Kim
(74) *Attorney, Agent, or Firm* — Kunzler Law Group (57) ABSTRACT

An approach to synchronization of logical copy relationships on a local site with those on a remote site that is a mirror. A withdraw command is received on the local site for logical copy relationships between local source tracks and local target tracks. The withdraw command is executed and sent to a remote site buffer, from which it will be transferred to the remote site. Change indicators are set for the at least one local track in the affected logical copy relationships. If the withdraw command is lost from the remote site buffer, the remote site buffer will be rebuilt using the change indicators. By setting change indicators for local tracks in a withdrawn logical copy relationship (even if the data in local tracks hasn't changed), the remote counterparts to these tracks on the remote site will be rewritten, resulting in withdrawal of the logical copy relationship there even if the withdrawal command was never sent to the remote site.

19 Claims, 7 Drawing Sheets

SYNCHRONIZATION OF LOGICAL COPY RELATIONSHIPS

FIELD

The subject matter disclosed herein relates to maintaining synchronization of logical copy relationships on a local site with logical copy relationships on a remote site.

BACKGROUND

Description of the Related Art

The use of "mirrors", or copies of data, plays an important role in many computing environments. Where data integrity and recovery is important, using a computing system to provide a mirror of another computing system can be a valuable tool. In many situations, a local site has an associated remote site that acts as a mirror.

Some mirroring environments use asynchronous mirroring; that is, when changes are made on the local site, they are not simultaneously executed on the mirror site. Rather, data representing the changes may be buffered at the local site and then transmitted for implementation on the remote site. In such environments, the data in the buffers may be lost when the mirroring session between the local site and remote site is suspended, whether the suspension is intention or unintentional. The local site may maintain data structures to track which tracks of data have changed over a certain period of time, and use those data structures to rebuild the buffer after a suspend. In certain systems, rather than rebuild the buffer, the system may use a logical indicator for what data needs to be copied to the mirror site.

Certain environments can also take advantage of logical copy operations, such as IBM's FlashCopy. A logical copy operation is a process that creates a logical copy of data by associating data stored at a source location (which is the data being copied) with a target location (which is the copy of the data). The logical copy operation may, for example, use pointers to establish a relationship between the data at the source location and the copy of that data at the target location without actually copying data from the source to the target. When the copy is deleted, the logical copy relationships may be deleted to effectively delete the copy.

Difficulties may arise where a logical copy operation is executed on the local site (establishing logical copy relationships on the local site) and then mirrored to the remote site (establishing corresponding logical copy relationships on the remote site). If the user withdraws the logical copy relationships on the local site (for example, by deleting the copy), and that withdraw command is lost due to a suspension while the withdraw command was in the buffer, then the local site and remote site may be out of synch since the withdraw command is never propagated to the remote site.

BRIEF SUMMARY

The present invention allows for synchronization of logical copy relationships between a local site and a remote site. The invention may be realized as an apparatus, a computer program product, a method, a system, or in other forms.

A computer program product stored on a computer readable medium may be configured to receive a withdraw command initiated by a user for a logical copy relationship between a local source track and a local target track on the local site. The withdraw command may cause the logical copy relationship between the local source track and the local target track to terminate on the local site. The withdraw command may be for a plurality of logical copy relationships between local source tracks and local target tracks. The computer program product may also be configured to send the withdraw command to a remote site buffer. The withdraw command may be read from the remote site buffer and sent to the remote site for execution if there is no suspension which causes the withdraw command to be lost from the remote site buffer.

The computer program product may also be configured to set a change indicator that indicates a change in data for one or both of the local source track and the local target track in the logical copy relationship that is the subject of the withdraw command. The change indicator may be a bit entry in a bitmap that contains one bit entry for each local track in a volume that the bitmap represents. The change indicator is typically used to indicate a change in data. The computer program product may take this action in response to receiving the withdraw command for the logical copy relationship.

The computer program product may be configured to detect a suspension of the mirror relationship between the local site and the remote site that causes the withdraw command in the remote site buffer to be discarded. It may also determine that data in those local tracks that have the change indicator set may be inconsistent at the remote site. Local tracks are tracks on the local site, and may be local source tracks and/or local target tracks.

The computer program product may send data in the local tracks that have the change indicator set to the remote site to be written at corresponding remote tracks. As a result, remote logical copy relationships between remote source tracks and remote target tracks will be withdrawn at the remote site.

In certain embodiments, the computer program product may determine if the establish command that created the logical copy relationship included a background copy command. If so, it may refrain from setting the change indicator when it receives the withdrawal command.

The invention may also be a method that includes the steps of receiving the withdraw command initiated by the user for the logical copy relationship between the local source track and the local target track on the local site, and sending the withdraw command to the remote site buffer. The method may also involve setting a change indicator for one or both of the local source track and the local target track in the affected logical copy relationship. The method may involve detecting a suspension of the mirror relationship that causes the withdraw command in the remote site buffer to be discarded, determining which local tracks have the change indicators set, and sending data in those local tracks to be written at the corresponding remote tracks at the remote site. The result is that data in at least one of the local source track and local target track is written at the remote site, which terminates the remote logical copy relationship at the remote site.

The invention may also be a system that includes a mirror module that creates a mirror relationship between the local site and the remote site, and that stores change data representing changes to local data in the remote site buffer on the local site. The change data may be the changed data itself, metadata, or any data sufficient to allow the remote site to properly mirror the change on the remote site.

The system may also use a bitmap for storage devices on the local site. The storage devices may include local tracks, and each local track may be associated with a bit entry in the bitmap. The bit entries may be the change indicators. A receipt module may receive the withdraw command initiated by the user for a set of logical copy relationships between local source tracks and local target tracks on the storage devices. The mirror module may send the withdraw command to the remote site buffer, and may be configured to transfer that withdraw command to the remote site. A backup module may set bit entries in the bitmap for the local target tracks in the logical copy relationships subject to the withdraw command. The mirror module may be configured to detect suspensions causing the withdraw command to be discarded from the remote site buffer, and, in response, to retrieve data from the local target tracks with the bit entries set in the bitmap, and to then send the data in the local target tracks to be written at the remote site.

The invention may also be realized as an apparatus that includes a receipt module that receives the withdraw command initiated by the user for a plurality of logical copy relationships between local source tracks and local target tracks. A transfer module may send the withdraw command to the remote site buffer. A backup module may set change indicators for the local target tracks in each logical copy relationship subject to the withdraw command. The change indicator may be a bit entry in a bitmap for maintaining synchronization between the local site and the remote site. Setting the change indicator may mean flipping the bit from one value to another; for example, from 0 to 1, or 1 to 0.

These features and advantages of the embodiments will become more fully apparent from the following description and appended claims, or may be learned by the practice of embodiments as set forth hereinafter.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in microcode, firmware, or the like of programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), a Blu-Ray Disc (BD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fibre cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fibre optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. These computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

Figure 1:
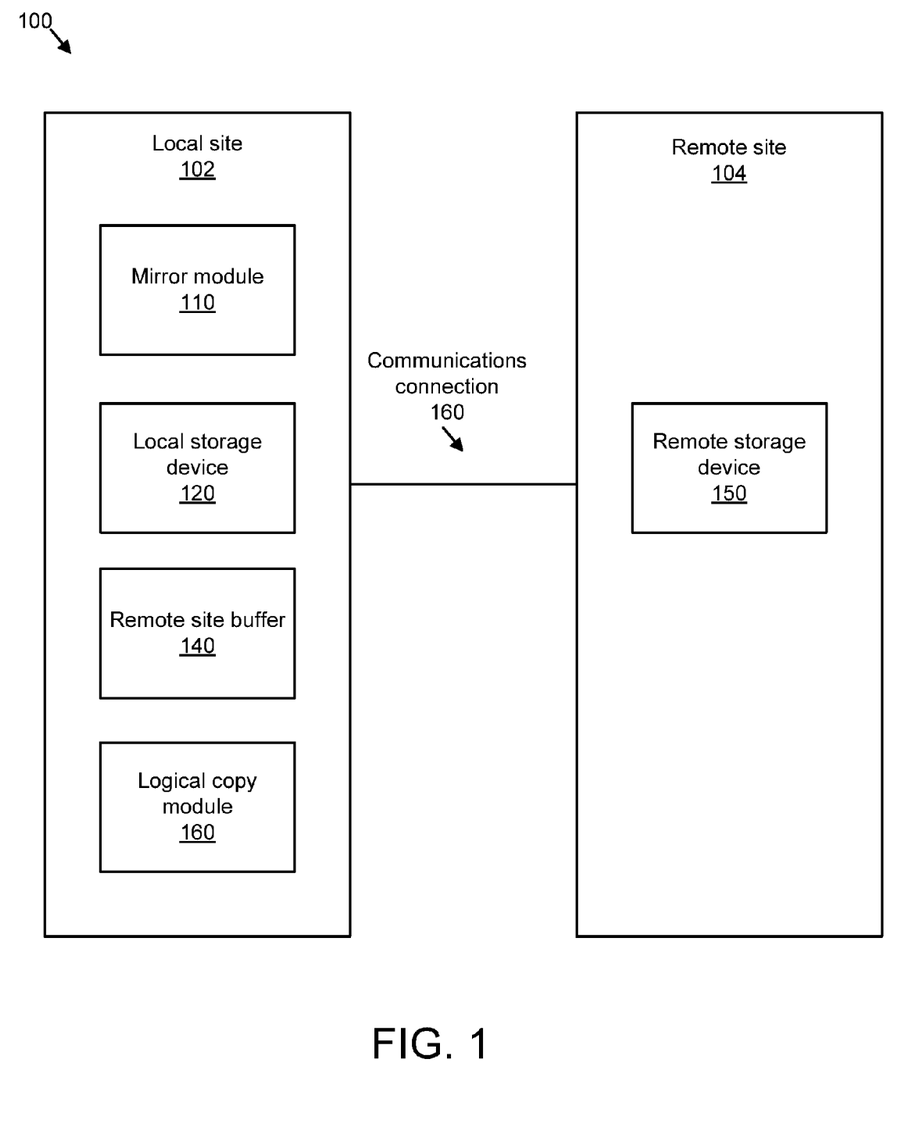
FIG. 1 is a schematic block diagram illustrating one embodiment of a system in a mirroring environment.

FIG. 1 shows one embodiment of a system 100 comprising a local site 102 and a remote site 104 connected by a communications connection 160. A local site 102 is a group of one or more computers which store data on a local storage device 120. The local storage device 120 may include one or more physical devices, and may be any variety of storage device that can store data. For example, the local storage device 120 may include solid state storage, hard disk drives, tape drives, and other varieties of storage devices. Examples of local sites 102 include: a single user with a single computer; a network of computers in a related organization, such as a business or department area within a business; and a university or department within a university.

The remote site 104 is a group of one or more computers which can store data on remote storage device 150. The remote storage device 150 may also be one or more physical devices, and may be any type of the many possible storage device types. The remote site 104 may be configured to act as a mirror for the local site 102. A mirror, as used in this application, is a system that stores a copy of the data stored at a local site 102. The mirror may be, for example, a backup of the data stored at a local site 102. In certain embodiments, the remote site 104 is located at a facility that is physically separate from the local site 102; however, the remote site 104 need not be physically separate or distant from the local site 102.

The local site 102 and the remote site 104 are connected by a communications connection 160. A communications connection 160 is a connection between the local site 102 and the remote site 104 which allows the local site 102 and the remote site 104 to exchange data. In one embodiment, the communications connection 160 is an Internet connection. The communications connection 160 may also be also be an Ethernet connection, a Fibre Channel connection, an Infiniband connection, or other suitable connection.

The local site 102 may also include a mirror module 110, and a remote site buffer 140. The mirror module 110 is configured to provide asynchronous data replication between the local site 102 and the remote site 104. The mirror module 110 may include hardware and software to support asynchronous data replication between the local site 102 and the remote site 104. In certain embodiments, the mirror module 110 is IBM's Global Mirror for z/Series (also commonly known as Extended Remote Copy, or XRC). In other embodiments, the mirror module 110 is IBM's Peer to Peer Remote Copy (PPRC) service.

While FIG. 1 shows the mirror module 110 implemented on the local site 102, the mirror module 110 may be implemented on the remote site 104, or on both the local site 102 and the remote site 104. In certain embodiments, the mirror module 110 may include a system data mover that resides on a host at the remote site 104. Thus, the mirror module 110 may send data from the local site 102 to the remote site 104, or the mirror module 110 on the remote site 104 may read data from the local site 102. The mirror module 110 may use either a "push" or a "pull" approach (or some combination thereof) to moving data, and the present invention is not limited to any particular approach.

In certain embodiments, the local site 102 includes a remote site buffer 140 that stores data and commands representing changes to the data on the local site 102 which needs to be sent to the remote site 104. For example, when data is written to one or more tracks on the local storage device 120, that data may also be placed into the remote site buffer 140. The mirror module 110 may then move that data from the remote site buffer 140 to the remote site 104, where the data may be stored in appropriate tracks.

The remote site buffer 140 may be a first in first out (FIFO) buffer on the local site 102. In certain embodiments, the remote site buffer 140 may be known as a sidefile and be part of a controller on the local site 102. In certain embodiments, at least a portion of the remote site buffer 140 is implemented in volatile memory. In such embodiments, data in the remote site buffer 140 may be lost if there is a suspension in the mirroring operations being performed. Thus, in certain embodiments, data may be lost from the remote site buffer 140 in the event of a hardware failure, an interrupt, a problem in the communications connection 160, an intentional suspension of the mirroring operations, or other even which causes loss of data in the remote site buffer 140.

The local site 102 may also contain a logical copy module 160 that can create and maintain logical copies of data sets. The logical copy module 160 may support a logical copy operation 318 (discussed below) that is a process that creates a logical copy of data by associating data stored at a source location (which is the subject of the logical copy operation 318) with a target location. Thus, a user may request to copy a data set, which copy is named data set B. The logical copy module 160 may respond by indicating that it has created a copy called data set B. In fact, rather than physically copy the data set A to a new location, the logical copy module 160 may have created a logical copy of data by associating the location for data set B with the data in data set A. In one embodiment, the logical copy module 160 is IBM's FlashCopy module. Logical copy is discussed in greater detail below in connection with FIG. 3.

Figure 2:
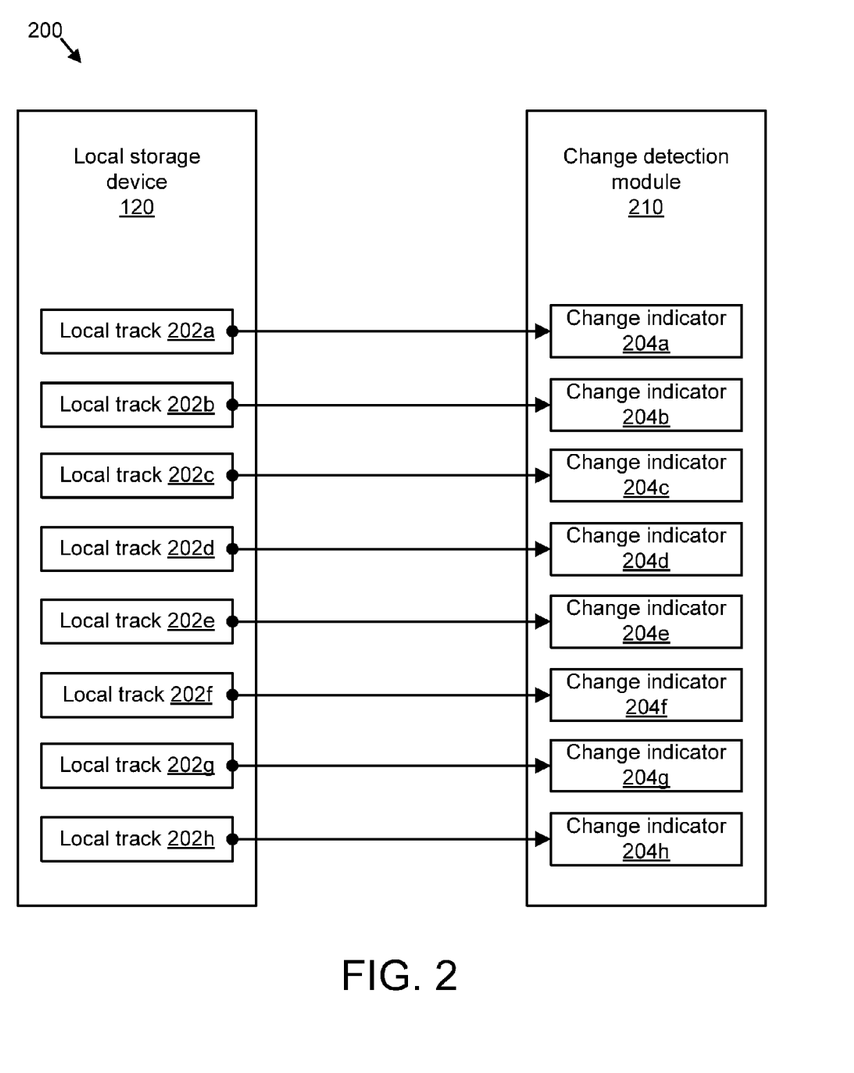
FIG. 2 is a schematic block diagram illustrating an embodiment of change indicators in a mirroring environment.

FIG. 2 shows one embodiment of a system 200 with the local storage device 120 and a change detection module 210. The local storage device 120, as explained above, may be any medium suitable for storing data on the local site 102. FIG. 2 depicts the local storage device 120 as including local tracks 202a-h. A local track 202 is a unit of data stored on the local storage device 120. The term "track" is used broadly in this application to encompass various possible units of data, and is not used in a way which limits the term to storage on hard disk drives, or to a particular hardware configuration of a hard disk drive. Thus, the local tracks 202 may be physical tracks on a hard disk drive, units of storage on a tape drive, or other units for storage on local storage device 120 which may vary with the media used to implement the local storage device 120. Similarly, there may be multiple local tracks 202 for each physical track of a hard disk drive on the local storage device 120. The local track may be a source track 312 or a target track 314, both of which are discussed in more detail in connection with FIG. 3b.

The change detection module 210 sets a change indicator 204 for a corresponding local track 202. The change indicator 204 indicates whether the local track 202 has been changed. The change indicator 204 may indicate that the associated local track 202 may be out of synchronization with the remote site 104.

For example, the data in local track 202a may be updated with a new value. In response to this change, the change detection module 210 may set the change indicator 204a, and the mirror module 110 may send the data to the remote site buffer 140 to be written to the remote site 104. In the event of a suspension, the remote site buffer 140 may lose the data representing the change to the local track 202a before the data can be sent to the remote site 104. In certain embodiments, the mirror module 110 may use the change indicators 204 to determine which local tracks 202 may have been changed, but have not had those changes sent to the remote site 104.

In one embodiment, the change detection module 210 may build and maintain one or more bitmaps for each volume in the local storage device 120 to store the change indicators 204. The change indicators 204 may be bits in the bitmap. When the local track 202a is changed, the change detection module 210 set the change indicator 204a by flipping a bit associated with the local track 202a in the bitmap. In this way, the change detection module 210 may monitor which tracks contain data that is out of synch between the local site 102 and the remote site 104. In the event that there is an event which causes the data in the remote site buffer 140 go be lost, the change indicators 204 may be used to ensure that changes made to data in the local tracks 202 are reflected on the remote site 104.

In certain embodiments, the change detection module 210 maintains more than one bitmap. For example, the change detection module 210 may maintain two bitmaps for each volume in the local storage device 120. The change detection module 210 may maintain a current bitmap (which may be referred to as bitmap n) and a previous bitmap (which may be referred to as bitmap n−1). As changes are made to data in the local tracks 202, the changes are reflected in the associated change indicators 204. After a period of time, the change detection module 210 may change the designation of the current bitmap to previous bitmap. The change detection module 210 may then reset the old version of the previous bitmap and use this as the new current bitmap.

For example, the change detection module 210 may use the current bitmap for five minutes. Once the five minutes are complete, the current bitmap may be designated the previous bitmap, and the previous bitmap may be reset and become the new current bitmap. Once an additional five minutes pass, the bitmaps are once again toggled. In such an embodiment, the change detection module 210 may maintain change indicators 204 for local tracks 202 for a five to ten minute window. In such embodiments, in the event of a failure, the mirror module 110 may send the data in all local tracks 202 having the change indicator 204 to be written at the remote site 104. Embodiments other than the one described above may also be implemented.

Figure 3A:
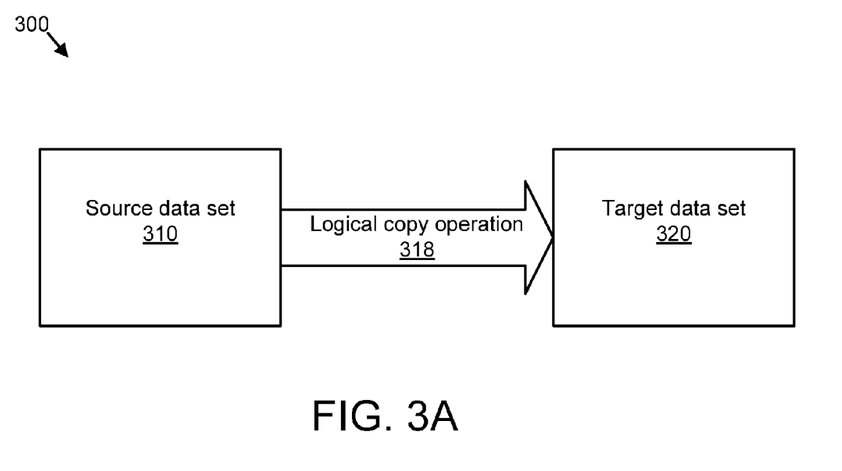
FIGS. 3A and 3B are schematic block diagrams illustrating an embodiment of a logical copy operation establishing logical copy relationships.
Figure 3B:
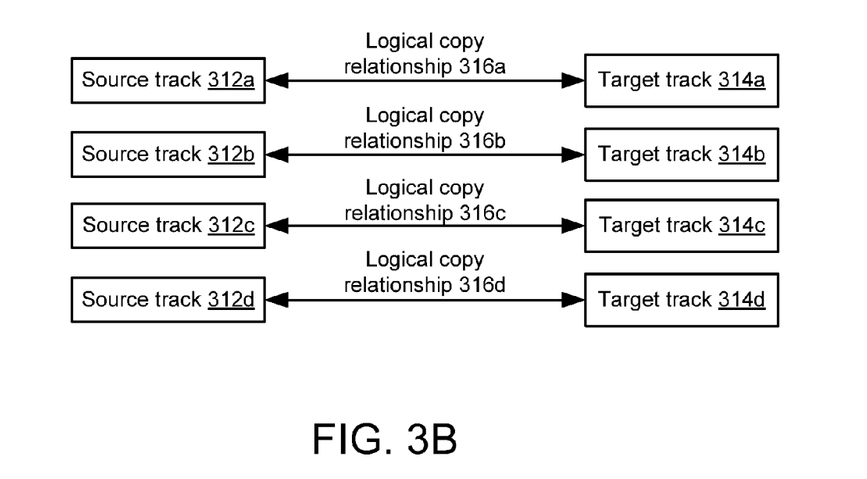

FIGS. 3a and 3b illustrate one embodiment of the operation of a logical copy operation 318. A logical copy operation 318 is a process that creates a logical copy of data by associating data stored at a source location (which is the subject of the logical copy operation) with a target location. The logical copy operation 318 creates a logical copy of a source data set 310 in a target data set 320. A data set, as used in this application, is any logical or physical grouping of data. For example, a data set may be a volume, a data set, a range of tracks, or other data grouping. FIG. 3A shows an example where a source data set 310 located at a source location is the subject of a logical copy operation 318 that creates a logical copy of the data set (called the target data set 320) at a target location. The logical copy operation may be used to create a point in time copy of one or more logical volumes and/or data sets. The target data set 320 may be used as a backup copy, a copy of a source data set 310 to be used for development without affecting the integrity of the source data set 310, or for other reasons. One example of a logical copy operation is IBM's FlashCopy operation.

FIG. 3b illustrates one embodiment of the result of executing a logical copy operation 318 against a source data set 310 causing the creation of a logical copy of the data at the target data set 320. In one embodiment, the logical copy operation causes one or more logical copy relationships 316a-d to be created, which logical copy relationships associate the source tracks 312a-d of the source data set 310 with the target tracks 314a-d of the target data set 320.

In one embodiment, the logical copy relationships 316a-d are pointers. In such an embodiment, the logical copy operation 318 may create pointers between the source tracks 312 and the target tracks 314. Thus, when an application requests data from the target track 314a, the request may be redirected by the pointer to the source track 312a. Other approaches to creating a logical copy relationship 316 may also be used. Creating logical copy relationships 316 which associate the source tracks 312 with the target tracks (instead of physically moving the data from source tracks 312 to target tracks 314) may allow a user and/or application to copy a source data set 310 far more quickly than would occur if the data in the source tracks 312 had to be physically moved to the target tracks 314 in order to make the copy.

In certain embodiments, the logical copy relationships 316 are adjusted to account for changes to the source tracks 312 and/or the target tracks 314. For example, after the target data set 320 (which is the logical copy of source data set 310) is made, an application may write data to target track 314c of the target data set 320. In response, the data may be written to target track 314c and the logical copy relationship 316c withdrawn. Withdrawing a logical copy relationship 316 means that the logical copy relationship between the source track 312 and the target track 314 is terminated. For example, a logical copy relationship 316 may be withdrawn by deleting or otherwise removing a pointer that associates source track 312c and target track 314c. To continue the example given above, future requests for the data in the target track 314c will use the data in target track 314c, and will not be forwarded to source track 312c.

In another example, after the source data set 310 is copied to target data set 320, a user or application may write new data to the source track 312d. Before the data in source track 312d is changed, the data may be physically copied from source track 312 to target track 314d. The data may then be written to the source track 312d. As the data in source track 312d has been physically moved to target track 314d, the logical copy relationship 316d may also be withdrawn.

In certain embodiments, the logical copy module 160 issues a withdraw command for the affected logical copy relationship 316. Such withdraw commands may be hidden from the user. For example, where the logical copy relationships 316 are withdrawn due to changes to either a source track 312 or a target track 314, the logical copy module 160 may issue the withdraw commands transparently to the user. In other embodiments, the withdraw command may be initiated by the user. For example, the user may decide that she is done working with the target data set 320, and delete the target data set 320. Deleting the target data set 320 may cause the logical copy module 160 to issue withdraw commands for the remaining logical copy relationships 316.

In certain embodiments, the logical copy operation 318 may include a background copy command. Where the logical copy operation 318 includes a background copy command, the logical copy operation 318 generally first causes the creation of logical copy relationships 316 as described above. In certain embodiments, the logical copy operation 318 may then cause the data in the source tracks 312 to be physically copied to the target tracks 314 as part of a background process. The background process may be given a low priority such that the background process does not interrupt more important processes on the local site 102. Once the background process completes, there will be a separate physical copy of the source data set 310 at the target data set 320. As the background process is executed, affected logical copy relationships 316 are removed. For example, when the data in source track 312a is copied to target track 314a, the logical copy relationship 316a is removed. When the data in the source tracks 312a-d is completely copied to target tracks 314a-d, the logical copy relationships 316a-d will have all been removed.

Figure 4:
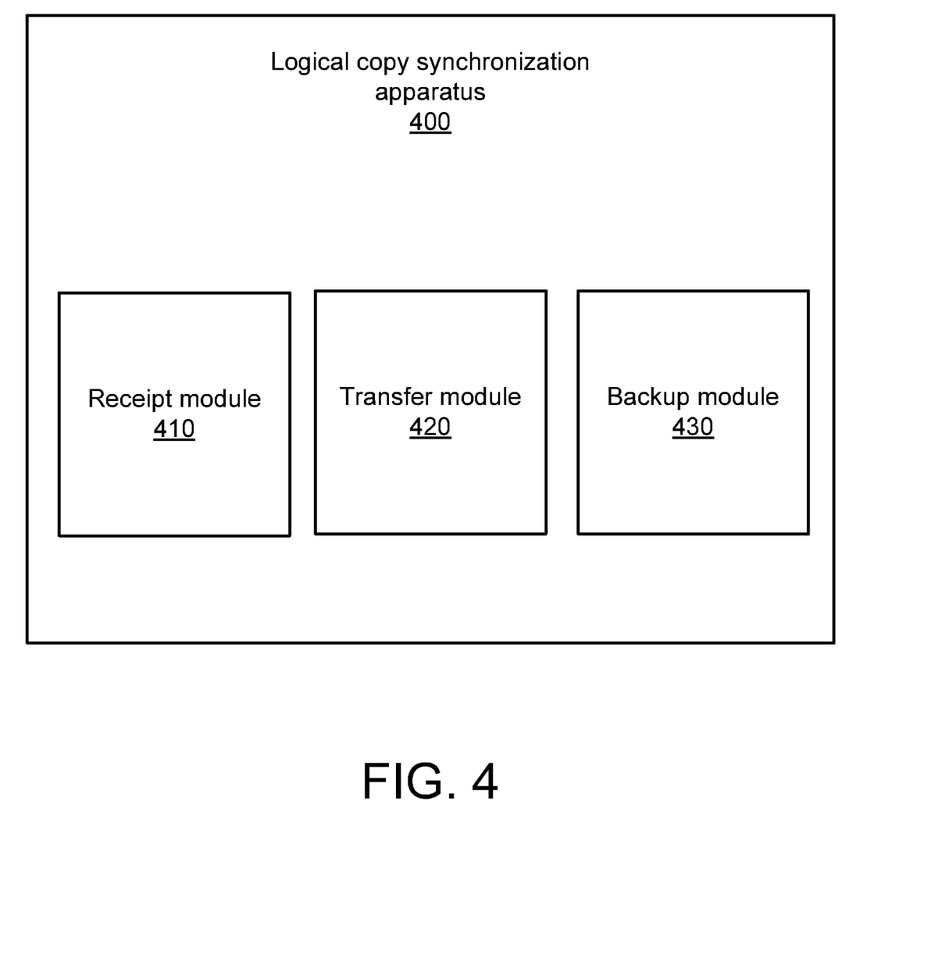
FIG. 4 is a schematic block diagram illustrating an embodiment of a logical copy synchronization apparatus.

FIG. 4 shows one embodiment of a logical copy synchronization apparatus 400 that includes a receipt module 410, a transfer module 420, and a backup module 430. The logical copy synchronization apparatus 400 may include more or fewer modules in varying embodiments.

Figure 5:
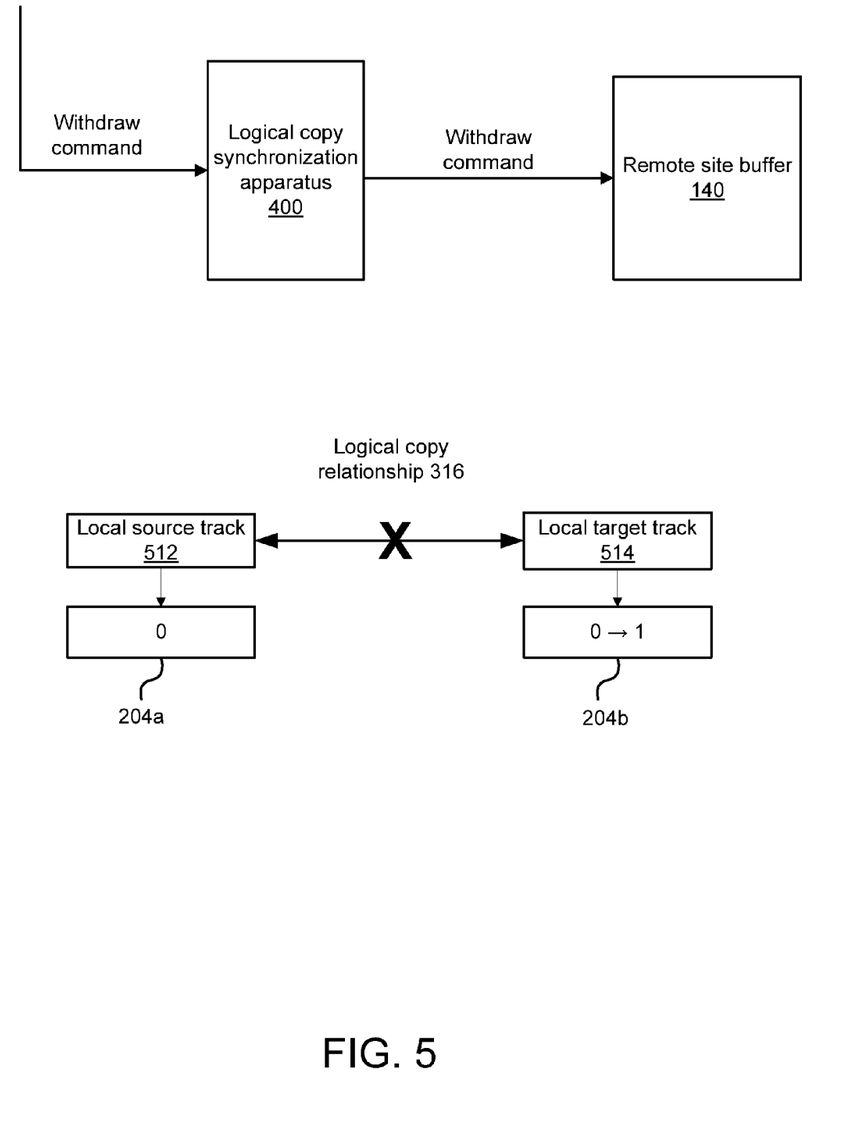
FIG. 5 is a schematic block diagram illustrating an embodiment of a case where a withdraw command is received.

In one embodiment, the receipt module 410 may be configured to receive a withdraw command for a logical copy relationship 316 between a local source track 512 and a local target track 514 (shown in FIG. 5). A local source track 512 is a source track 312 on the local site 102 that is being asynchronously replicated. A local target track 514 is a target track 314 on the local site 102 that is being asynchronously replicated. The withdraw command, as explained above, causes the logical copy relationship 316 between the local source track 512 and the local target track 514 to terminate on the local site 102. In certain embodiments, the withdraw command causes a pointer associating the local source track 512 and the local target track 514 to be removed.

The logical copy synchronization apparatus 400 may also include a transfer module 420 that sends the withdraw command to a remote site buffer 140. The withdraw command may be transferred from the remote site buffer 140 on the local site 102 to the remote site 104 that is a mirror of the local site 102.

The backup module 430 may be configured to set the change indicator 204 for one or both of the local source track 512 and the local target track 514 in response to receiving the withdraw command for the logical copy relationship 316 between the local source track 512 and the local target track 514. In certain embodiments, when the withdraw command is issued for a logical copy relationship 316, the backup module 430 sets the change indicator 204 for the local target track 514 rather than the local source track 512.

FIG. 5 shows an example of how a logical copy synchronization apparatus 400 may operate. FIG. 5 shows the logical copy synchronization apparatus 400 receiving a withdraw command initiated by a user. As explained above, the withdraw command may be initiated by a user when, for example, the user deletes the target data set 320 that is a copy of the source data set 310. The logical copy synchronization apparatus 400 may send the withdraw command to the remote site buffer 140. The mirror module 110 will coordinate transferring the withdraw command to the remote site 104, where the withdraw command will be executed, terminating the logical copy relationship 316 between the remote source track and the remote target track on the remote site 104 that correspond to the local source track 512 and the local target track 514, thus ensuring that the remote site 104 is a mirror of the local site 102.

The logical copy synchronization apparatus 400 may also cause the change indicator 204 to be set for one of the local source track 512 and the local target track 514 on the local site 102. As shown in FIG. 5, the logical copy synchronization apparatus 400 may cause the change indicator 204b for the local target track 514 to be set. As explained above, the change indicator 204b may be a bit in a bitmap that is associated with the local target track 514. In the example of FIG. 5, the bit is flipped from a 0 to a 1, while the change indicator 204a bit is left at a 0. The withdraw command causes the logical copy relationship 316 to be withdrawn.

While the above example, and the application, may speak of a simple case where there is a withdraw command that affects one logical copy relationship 316, in many cases the withdraw command will affect multiple logical copy relationships 316. For example, the withdraw command may specify a plurality of local tracks 202 in logical copy relationships 316 on the local site 102. In certain embodiments, the withdraw command specifies a range of local tracks 202 for which the logical copy relationships 316 are to be withdrawn.

The logical copy relationships 316 may be created by an establish command. The establish command may be initiated by a user; for example, the user may initiate the establish command by directing the logical copy module 160 to create a copy of a particular source data set 310. In certain embodiments, the establish command that creates the logical copy relationships 316 may include a background copy command. In certain embodiments, where the establish command included a background copy command, the logical copy synchronization apparatus 400 may refrain from setting change indicators (such as change indicator 204b or the change indicator 204a for the local source track 512 and the local target track 514) if the establish command included a background copy command.

Figure 6A:
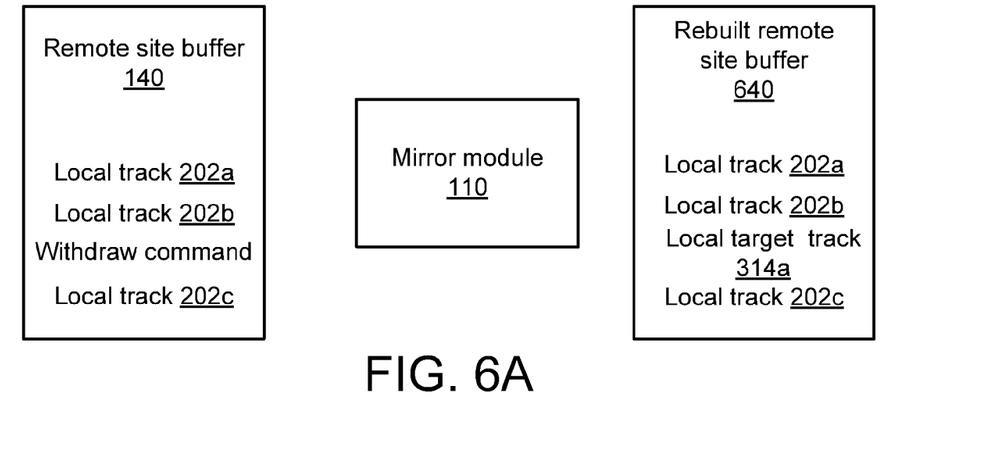
FIGS. 6A, 6B, and 6C are schematic block diagrams illustrating an embodiment of a case where a withdraw command is received, a suspension occurs, and the remote logical copy operation is still withdrawn.
Figure 6B:
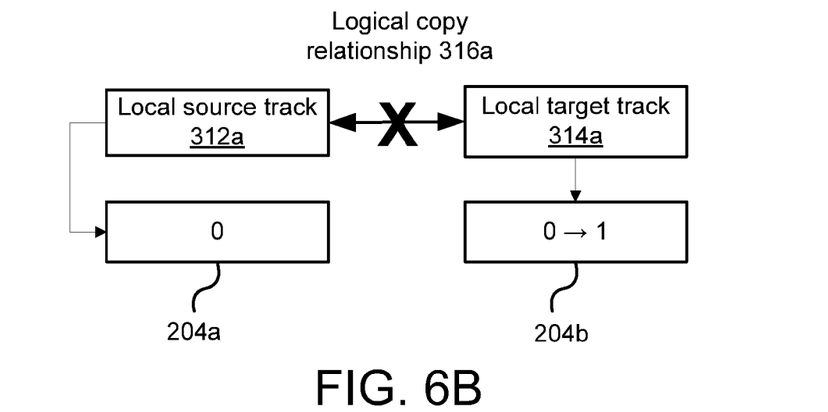
Figure 6C:
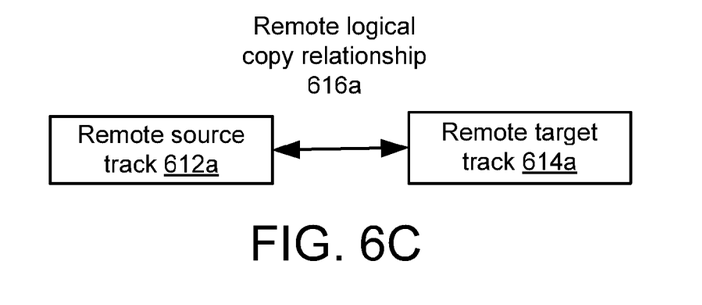

FIGS. 6A, 6B, and 6C show how the method described above may help ensure consistency between the local site 102 and the remote site 104 in the event of a suspension causing the remote site buffer 140 to be lost. FIG. 6A shows a remote site buffer 140 with local tracks 202a-c to be sent to the remote site 104, along with a withdraw command. As explained above, the local tracks 202a-c may have been changed on the local site 102. Data representing these changes is placed in the remote site buffer 140 to ensure that the remote site 104 executes appropriate commands that make changes to remote tracks corresponding to local tracks 202a-c on the remote site 104.

A withdraw command is also in the remote site buffer 140. In this example, the withdraw command is directed to logical copy relationship 316a between local source track 312a and local target track 314a on the local site 102. As explained above, the withdraw command will typically be for multiple logical copy relationships 316, but only a single logical copy relationship is discussed here for ease of understanding. The single case discussed here is easily extended to the case of multiple logical copy relationships 316.

When the withdraw command is received at the local site 102, the logical copy relationship 316a on the local site 102 is terminated (as seen by the "X" in FIG. 6B). In addition, the change indicator 204b may be set for the local target track 314a. In certain embodiments, the change indicator 204a for the local source track 312a is changed instead. In other embodiments, both change indicators 204a and 204b are set.

The local source track 312a on the local site 102 may correspond to a remote source track 612a on the remote site 104, and the local target track 314a may similarly correspond to a remote target track 614a. When the logical copy relationship 316a was established on the local site 102, the remote logical copy relationship 616a was similarly established in response on the remote site 104. Following execution of the withdrawal command on the local site 102, causing the logical copy relationship 316a to be terminated, the remote logical copy relationship 616a remains on the remote site 104. Thus, the data on the local site 102 and the remote site 104 may be out of synchronization until the withdraw command is transferred from the remote site buffer 140 to the remote site 104.

In the event of a suspension, the data in the remote site buffer 140 may be lost. The changes that were in the remote site buffer 140 at that time were therefore not transmitted to the remote site 104 is not a true mirror of the local site 102 as a result. The mirror module 110 may rebuild the remote site buffer 140, thereby creating the rebuilt remote site buffer 640 shown in FIG. 6A.

In certain embodiments, the withdraw command itself may be permanently lost when the suspension occurs. In response to the suspension, the mirror module 110 may build the rebuilt remote site buffer 640. Using the change indicators 204, the mirror module 110 may determine that the local tracks 202a-c were changed on the local site 102 and cause the data contained therein to be inserted in the rebuilt remote site buffer 640. In addition, the mirror module 110 may also see the change indicator 204b for the local target track 314a has been set and caused the data contained therein to be inserted into the rebuilt remote site buffer 640. As can be seen in the example shown in FIG. 6A, the withdraw command itself may be permanently lost and may not be placed in the rebuilt remote site buffer 640.

The mirror module 110 may then cause the data in the rebuilt remote site buffer 640 to be written on the remote site 104. As a result, data corresponding to the local target track 314a may be written to the remote target track 614a. This write operation causes the remote logical copy relationship 616a to be terminated, which synchronizes the remote source track 612a, the remote target track 614a, and the remote logical copy relationship 616a with the local source track 312a, local target track 314a, and the logical copy relationship 316a.

Thus, the mirror module 110 may detect a suspension of the mirror relationship between the local site 102 and the remote site 104 that causes the withdraw command in the remote site buffer 140 to be discarded. The withdraw command may be discarded because it was stored in volatile memory which was discarded due to the suspension. The mirror module 110 may also determine that data in local tracks 202 that have their associated change indicators 204 set may be inconsistent at the remote site 104.

The mirror module 110 may send the data in the local tracks 202 having the change indicator 204 set to be written at corresponding remote tracks on the remote site 104. The write operation causes any remote logical copy relationship 616a between a remote source track 612a and a remote target track 614a to be withdrawn at the remote site 104. As explained above, this may ensure that a logical copy relationship 316a is kept in synch with a remote logical copy relationship 616a even when the withdraw command is lost and never sent to the remote site 104.

In certain embodiments, the change indicators 204 are bitmap entries that may be used to track when a change has been made to a local track 202; that is, the bit entry is flipped if there is a change to the content of the associated local track 202. The bit entry may thus indicate that a change has occurred, that the associated local track 202 may be out of synchronization with the remote site 104, and that this local track 202 should be resynchronized in the event of a suspension. In certain embodiments, the present invention may flip the bit entry even though there is no change to the local track 202 if the local track 202 is part of a logical copy relationship that has been withdrawn on the local site 102.

Figure 7:
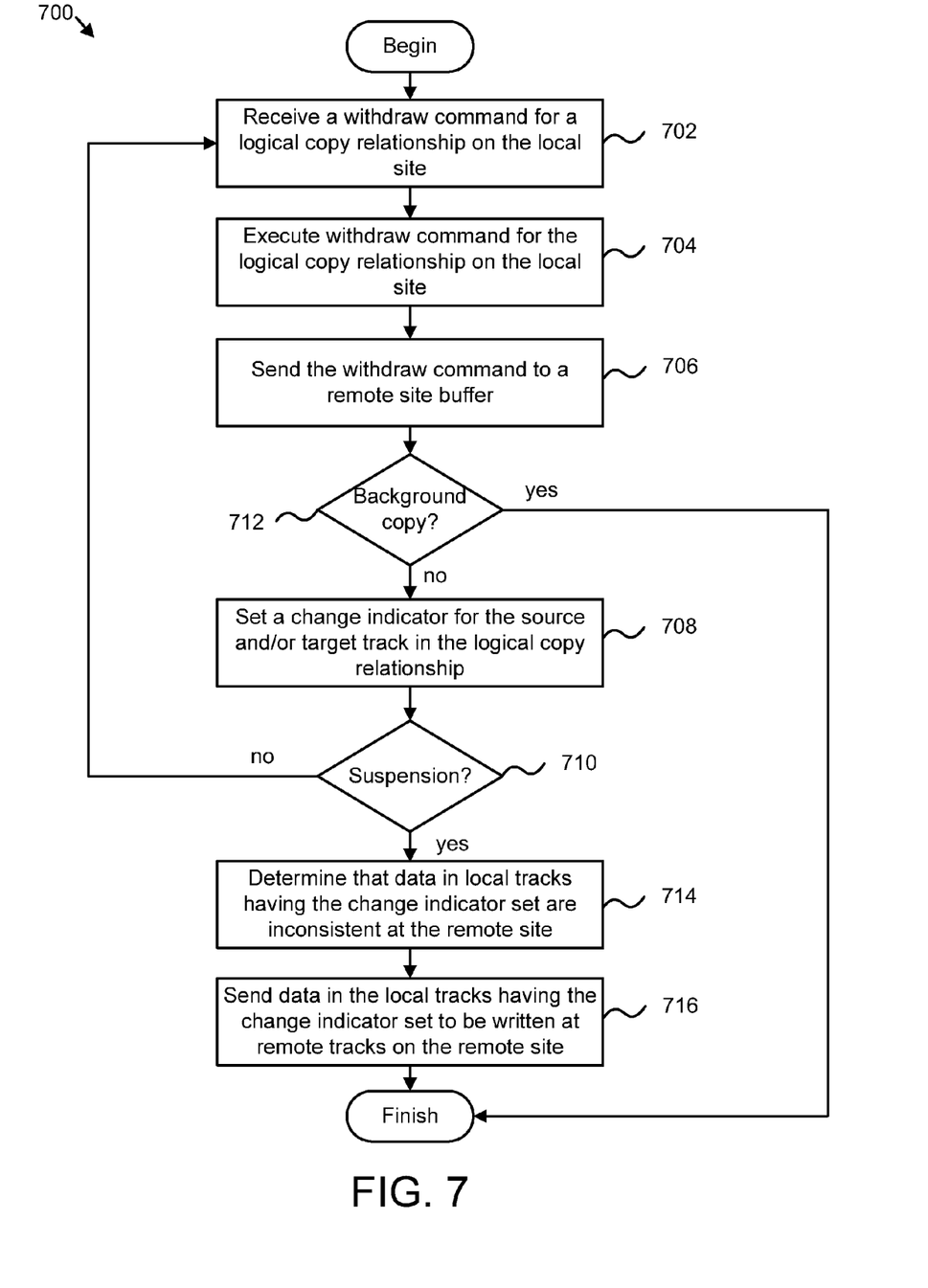
FIG. 7 is a flow chart diagram illustrating a method for synchronization of logical copy relationships.

FIG. 7 shows one embodiment of a method 700 for maintaining synchronization of logical copy relationships 316 on a local site 102 and a remote site 104. The method may begin with receiving 702 a withdraw command for a logical copy relationship 316 on the local site 102. The withdraw command may cause logical copy relationships 316 between local source tracks 512 and local target tracks 514 to terminate on the local site 102. The method may further comprise executing 704 the withdraw command for the logical copy relationships 316 on the local site 102 and sending 706 the withdraw command to a remote site buffer 140 on the local site 102. In such embodiments, the withdraw command, absent a suspension, may be transferred from the remote site buffer 140 to the remote site 104 for execution.

The method 700 may involve determining 712 whether the establish command which created the logical copy relationships 316 being withdrawn included a background copy command. If the establish command did include a background copy command, the method may continue without taking further steps to synchronize the logical copy relationships 316 on the local site 102 with those on the remote site 104. In certain embodiments, if the establish command included a background copy command, the logical copy synchronization apparatus 400 does not perform the step 708.

In certain embodiments, if the establish command did not include a background copy command, the method 700 may also include setting 708 a change indicator 204 for the local source tracks 512 and/or the local target tracks 514 in the logical copy relationships 316 that are being withdrawn by the withdraw command. In certain embodiments, only the change indicator 204 for the local target tracks 514 are set. Setting the change indicator 204 indicates that the associated local track 202 has changed on the local site 102. The change indicator 204 may be set when the withdraw command is received even though the data in the local target track 514 has not actually changed. Thus, in certain embodiments, a change indicator 204 is set, indicating that the associated local track 202 has changed, in response to receiving the withdraw command for the logical copy relationship regardless of whether or not the data in the local track 202 has actually changed.

The method 700 may also involve monitoring 710 the system for a suspension which causes the remote site buffer 140 to be discarded. If there is no suspension, the steps of receiving withdraw commands, placing those withdraw commands in the remote site buffer 140, and setting change indicators 204 may continue.

In certain embodiments, the method 700 may continue with determining that data in the local tracks 202 having the change indicators 204 set may be inconsistent at the remote site 104. In such situations, only some of the data in local tracks 202 may be inconsistent at the remote site 104. The method 700 may involve sending data in the local tracks 202 having the change indicator 204 set to be written at the associated remote tracks on the remote site 104. As a result, those remote tracks that are in remote logical copy relationships 616a which were terminated by the withdraw command on the local site 102 will be withdrawn from the remote logical copy relationships 616 on the remote site 104 when the data is written to a remote track (whether the remote source track 612 or the remote target track 614) in the remote logical copy relationship 616.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product stored on a non-transitory computer readable medium, the computer program product configured to:

maintain a bitmap for storage devices on a local site, each storage device comprising a plurality of local tracks, wherein each local track is associated with a change indicator in the bitmap that indicates a change in data when set;

receive a withdraw command initiated by a user for a logical copy relationship between a local source track and a local target track on a local site, wherein the withdraw command causes the logical copy relationship between the local source track and the local target track to terminate on the local site;

send the withdraw command to a remote site buffer;

transfer the withdraw command from the remote site buffer to the remote site; and for one or both of the local source track and the local target track in the logical copy relationship that is a subject of the withdraw command, set the change indicator in response to receiving the withdraw command for the logical copy relationship.

2. The computer program product of claim 1, further configured to: detect a suspension of a mirror relationship between the local site and the remote site, the suspension causing the withdraw command in the remote site buffer to be discarded.

3. The computer program product of claim 2, further configured to: determine that data in local tracks having the change indicator set may be inconsistent at the remote site, wherein the local tracks comprise local source tracks and local target tracks.

4. The computer program product of claim 3, further configured to: send data in the local tracks having the change indicator set to be written at remote tracks on the remote site, such that a remote logical copy relationship between a remote source track and a remote target track is withdrawn at the remote site.

5. The computer program product of claim 1, wherein the withdraw command is for a plurality of local source tracks and local target tracks in logical copy relationships on the local site.

6. The computer program product of claim 1, further configured to: determine if an establish command creating the logical copy relationship comprised a background copy command.

7. The computer program product of claim 6, further configured to: refrain from setting the change indicator in response to receiving the withdrawal command where the establish command comprised a background copy command.

8. A method comprising the steps of:

maintaining, by use of a processor, a bitmap for storage devices on a local site, each storage device comprising a plurality of local tracks, wherein each local track is associated with a change indicator in the bitmap that indicates a change in data when set;

receiving a withdraw command initiated by a user for a logical copy relationship between a local source track and a local target track on a local site, wherein the withdraw command causes the logical copy relationship between the local source track and the local target track to terminate on the local site;

sending the withdraw command to a remote site buffer;

transferring the withdraw command from the remote site buffer to the remote site; and for one or both of the local source track and the local target track in the logical copy relationship that is a subject of the withdraw command, setting the change indicator in response to receiving the withdraw command for the logical copy relationship.

9. The method of claim 8, further comprising: detecting a suspension of a mirror relationship between the local site and the remote site, the suspension causing the withdraw command in the remote site buffer to be discarded.

10. The method of claim 9, further comprising: determining that data in local tracks having the change indicator set may be inconsistent at the remote site.

11. The method of claim 10, further comprising: sending data in the local tracks having the change indicator set to be written at remote tracks on the remote site, such that a remote logical copy relationship between a remote source track and a remote target track is withdrawn at the remote site.

12. The method of claim 8, wherein the withdraw command is for a plurality of local tracks in logical copy relationships on the local site.

13. The method of claim 8, further comprising: determining whether an establish command creating the logical copy relationship comprised a background copy command.

14. The method of claim 13, further comprising: refraining from setting the change indicator in response to receiving the withdrawal command where the establish command comprised a background copy command.

15. A system comprising:

a mirror module configured to create a mirror relationship between a local site and a remote site communicatively connected to the local site, the mirror module also configured to store change data representing changes to local data in a remote site buffer on the local site;

a bitmap for storage devices on the local site, each storage device comprising a plurality of local tracks, wherein each local track is associated with a change indicator in the bitmap that indicates a change in data when set;

a receipt module configured to receive a withdraw command initiated by a user for a logical copy relationship between a local source track and a local target track on the storage devices on the local site, wherein the withdraw command causes the logical copy relationship between the local source track and the local target track to terminate on the local site;

the mirror module further configured to send the withdraw command to the remote site buffer and transfer the withdraw command from the remote site buffer to the remote site; and a backup module configured to set the change indicators in the bitmap for one or both of the local source track and the local target track in the logical copy relationship that is a subject of the withdraw command in response to receiving the withdraw command for the logical copy relationship.

16. The system of claim 15, the mirror module further configured to detect a suspension of the mirror relationship, the suspension causing the withdraw command in the remote site buffer to be discarded.

17. The system of claim 16, the mirror module further configured to:

retrieve data from the local target tracks with the change indicators set in the bitmap; and send the data in the local target tracks to be written at the remote site.

18. An apparatus comprising:

a bitmap for storage devices on the local site, each storage device comprising a plurality of local tracks, wherein each local track is associated with a change indicator in the bitmap that indicates a change in data when set;

a receipt module that receives a withdraw command initiated by a user for a logical copy relationship between a local source track and a local target track on a local site, wherein the withdraw command causes the logical copy relationship to terminate on the local site;

a transfer module that sends the withdraw command to a remote site buffer for a remote site that is a mirror of the local site;

a mirror module that sends the withdraw command to the remote site buffer and transfers the withdraw command from the remote site buffer to the remote site; and a backup module that sets, for one or both of the local source track and the local target track in the logical copy relationship that are a subject of the withdraw command, a change indicator in response to receiving the withdraw command for the logical copy relationship.

19. The apparatus of claim 18, wherein the backup module determines if the establish command creating the plurality of logical copy relationships comprised a background copy command, and refrains from setting the change indicator for the local target tracks in response to determining that the establish command comprised a background copy command.

* * * * *